(12) United States Patent
Davis, Jr. et al.

(10) Patent No.: US 6,810,655 B2
(45) Date of Patent: Nov. 2, 2004

(54) PERFORMANCE ENHANCED CONTROL OF DLN GAS TURBINES

(75) Inventors: Lewis Berkley Davis, Jr., Schenectady, NY (US); Bruce G. Norman, Schenectady, NY (US); Robert Joseph Iasillo, Glenville, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/629,833

(22) Filed: Jul. 30, 2003

(65) Prior Publication Data

US 2004/0025512 A1 Feb. 12, 2004

Related U.S. Application Data

(62) Division of application No. 10/058,138, filed on Jan. 29, 2002, now Pat. No. 6,722,135.

(51) Int. Cl.[7] ................................................. F02C 9/28
(52) U.S. Cl. .................................................... 60/39.281
(58) Field of Search ............................. 60/39.281, 725, 60/734

(56) References Cited

U.S. PATENT DOCUMENTS

| | | | | |
|---|---|---|---|---|
| 5,257,496 A | * | 11/1993 | Brown et al. | 60/39.281 |
| 5,319,931 A | | 6/1994 | Beebe et al. | |
| 5,327,718 A | * | 7/1994 | Iwata et al. | 60/773 |
| 5,365,732 A | | 11/1994 | Correa | |
| 5,491,970 A | | 2/1996 | Davis, Jr. et al. | |
| 5,857,321 A | | 1/1999 | Rajamani et al. | |
| 6,195,607 B1 | | 2/2001 | Rajamani et al. | |

* cited by examiner

Primary Examiner—Louis J. Casaregola
(74) Attorney, Agent, or Firm—Nixon & Vanderhye PC

(57) ABSTRACT

A control system and methodology for a gas turbine having multiple fuel valves for multiple combustion chambers involves tuning the fuel values to associated combustion chambers to optimize nitrous oxide emissions; dynamic pressure, and variation in fuel/air ratio. Further, fine tuning of the fuel values is then used to maintain dynamic pressure oscillations, nitrous oxide emissions or variation in fuel/air ratio within predetermined limits.

12 Claims, 6 Drawing Sheets

Combustion & Fuel Tuning System

PERFORMANCE ENHANCED CONTROL OF DLN GAS TURBINES

This application is a Division of 10/058,138, filed Jan. 29, 2002, now U.S. Pat. No. 6,722,135.

FIELD OF THE INVENTION

This invention relates to fuel control systems for gas turbines. In particular, this invention relates to fuel trimming systems for industrial gas turbines having a plurality of combustion chambers.

DESCRIPTION OF THE RELATED ART

Industrial gas turbines are required to perform at higher and higher efficiencies while producing less and less undesirable air polluting emissions. Higher efficiencies in gas turbines are generally achieved by increasing overall gas temperature in the combustion chambers of the gas turbine. Emissions are reduced by lowering the maximum gas temperature in the combustion chamber. The demand for higher efficiencies which results in hotter combustion chambers conflicts to an extent with the regulatory requirements for low emission gas turbines.

The primary air polluting emissions produced by gas turbines burning conventional hydrocarbon fuels are oxides of nitrogen ($NO_x$), carbon monoxide (CO) and unburned hydrocarbons (UHC). The oxidation of molecular nitrogen in gas turbines increases dramatically with the maximum hot gas temperature in the combustion reaction zone of each combustion chamber. The rate of chemical reactions forming oxides of nitrogen is an exponential function of temperature. The volume of $NO_x$ emissions can be very great even if the hot maximum temperature is reached only briefly. A common method for reducing $NO_x$ emissions is to lower the maximum hot gas temperature in the combustion chamber by maintaining a lean fuel-air ratio.

If the fuel-air mixture in a combustion chamber is too lean, then excessive emissions of carbon monoxide and unburned hydrocarbon occur. CO and UHC emissions result from incomplete fuel combustion. Generation of these emissions usually occurs where the fuel-air mixture excessively quenches combustion in the reaction zone. The temperature in the reaction zone must be adequate to support complete combustion or the chemical combustion reactions will be quenched before achieving equilibrium. Unfortunately, prematurely quenched combustion too often occurs in current low-$NO_x$ combustors that operate with fuel-air mixtures near the lean limit of flammability.

The rates of CO and UHC emission generation due to combustion quenching are non-linear functions of reaction zone temperature and peak sharply at the lean fuel-air ratio limit of flammability. To minimize CO and UHC emissions, the reaction zones of gas turbine combustors should have adequate fuel-air mixtures to avoid the lean limit of flammability. However, combustors must still operate with lean fuel-air mixtures to reduce $NO_x$ emissions. To balance the conflicting needs for reduced CO, UHC and $NO_x$ emissions, extremely precise control is required over the fuel-air mixture in the reaction zones of the combustors in an industrial gas turbine.

The fuel-air ratio in each combustion chamber of a gas turbine should be the same. A constant fuel-air mixture in each combustor allows the mixture to be maintained at the lean ratio that best reduces CO, UHC and $NO_x$ emissions. In addition, uniform fuel-air ratios among chambers ensures a uniform distribution of temperature among the combustors of a gas turbine. A uniform distribution of temperature and pressure reduces the thermal and mechanical stresses on the combustion, turbine and other hot stream components of the gas turbine. A reduction in these stresses prolongs the operational lives of combustor and turbine parts. Peak hot gas temperature in some combustion chambers (but not others) increases thermal stresses and reduces the strength of materials in the hotter high fuel-air ratio chambers and turbine parts immediately downstream of those chambers.

It has proven extraordinarily difficult to achieve truly uniform temperature and pressure distribution in multiple combustion chambers of industrial gas turbines. For example, the air flow distribution in combustion chambers is perturbed by variations in the components of the combustion chambers and their assembly. These variations are due to necessary tolerances in manufacturing, installation and assembly of the combustor and gas turbine parts. In addition, the air flow paths are irregular approaching the combustion system from the compressor and exiting at the combustor discharge to the turbine. These irregular paths affect the air flow through the combustor and cause a non-uniform air flow distribution in the combustors. For example, localized air flow resistance is caused by the lines for turbine bearing lube oil in the compressor discharge air flow path. The irregular air flow distribution among combustion chambers affects the fuel-air ratio differently in each combustion chamber. Variations in the air flow in each combustion chamber make it difficult to maintain constant fuel-air ratios in all combustion chambers.

Prior fuel systems for multiple combustion chamber industrial gas turbines provide uniform fuel flow distribution among the chambers. These systems have a common control that meters the same rate of fuel to each chamber. These systems do not trim the fuel flow to each combustion chamber to maintain a uniform fuel-air ratio in each chamber. Accordingly, these prior fuel systems cannot maintain a truly uniform fuel-air ratio in all combustion chambers when the air flow is not uniformly distributed among combustion chambers.

One proposed system for overcoming the above-described problems involves trimming the fuel flow to each combustion chamber in a multiple chamber gas turbine combustion system, as described in U.S. Pat. No. 5,661,969 issued to Beebe et al, commonly assigned to the General Electric Co., and incorporated herein by reference. The fuel flow distribution among chambers is trimmed to match the air flow distribution to obtain a uniform distribution of fuel-air ratios among chambers. Optimal fuel trimming equalizes the fuel-air ratio in all chambers regardless of uncontrolled chamber-to-chamber variations in the air flow.

The control signals to the fuel trimming system are: (1) individual combustion chamber fuel flow rates, (2) individual combustion chamber dynamic pressure levels, and (3) gas turbine exhaust temperature distribution around the entire turbine discharge. These signals may be used individually or in combination to determine the optimum fuel flow distribution set by the trimming system. Conventional instrumentation for each combustion chamber is used to obtain these control signals for the fuel trimming system. These instruments are well known in the gas turbine industry and have proven reliable.

One embodiment of the system described in Beebe et al is a gas turbine comprising a compressor, a multi-chamber combustor receiving pressurized air from the compressor, a turbine drivingly connected to the compressor and receiving exhaust from the combustor, a fuel system for providing fuel to each chamber of the multi-chamber combustor, where the fuel system trims the fuel to individual chambers to match the air flow to each chamber.

Similarly, another embodiment of Beebe et al involves a combustion section of a gas turbine having a plurality of chambers, at least one of the chambers comprising: at least one combustion reaction zone receiving air from a compressor and fuel from a fuel distributor; the fuel distributor having a fuel trim orifice and a fuel trim valve, the fuel trim valve for the at least one chamber being individually set to trim the flow of fuel to the chamber.

The advantages provided by these systems described in Beebe et al include uniform distribution of fuel-air ratios among multiple combustion chambers to minimize the emissions of objectionable air pollutants in the gas turbine exhaust, including nitrogen oxide, carbon monoxide, and unburned hydrocarbons over the entire load range of a gas turbine. In addition, uniform distribution of fuel-air ratio prolongs the operational life of the hot stream components of the gas turbine.

Thus, the systems described in Beebe et al provide a method for obtaining a uniform distribution of fuel-air ratio among all the combustion chambers of a multiple chamber combustion system in an industrial gas turbine. In particular, the described systems maintain a uniform fuel-air ratio in each chamber of a multiple chamber gas turbine combustion chamber system, when air flow is not uniformly distributed among the combustion chambers. The systems operate to trim the fuel flow distribution among the combustion chambers to match variations in air flow to each chamber.

SUMMARY OF THE INVENTION

The current invention features linked feedback control of those machine operating parameters that are critical to achieving maximum performance while meeting emissions requirements and optimizing hardware life. Specifically the invention calls for an array of sensors and fuel flow control to individual combustion chambers to provide input and control methods to a constrained optimization control algorithm (such as the constrained gradient-search technique) that will operate the turbine in a manner to achieve optimum levels of the critical parameters. The current invention directly results in improved control of the fuel to air ratio and dynamic pressures in each individual combustion chamber to optimize their individual performances.

The present invention utilizes feedback control to optimize performance—output and efficiency—and emissions by deploying sensors in, and controlling fuel flow to, individual combustor cans in a multichamber machine. The machine may have either a conventional diffusion combustor with diluent such as water injected into the combustors or a lean premixed Dry Low $NO_x$ (DLN) combustion system.

The invention minimizes the emissions, notably nitrogen oxide, that are generated because of the inherent chamber-to-chamber variability that exists in a multi-chamber machine and results in the need to apply "worst case" control means for dynamics, etc. This results in being able to improve output and efficiency from a given gas turbine (by increases in, e.g., firing temperature and pressure ratio) while still meeting emissions.

The invention maximizes the power output capability of the gas turbine while maintaining the total emissions and dynamic pressure oscillations in each combustion chamber within acceptable limits. This invention performs this optimization in the presence of varying load conditions and varying ambient conditions.

BRIEF DESCRIPTION OF THE DRAWINGS

The accompanying drawings contain reference numerals used in the following detailed description of an embodiment of the present invention.

DETAILED DESCRIPTION OF THE INVENTION

Figure 1:
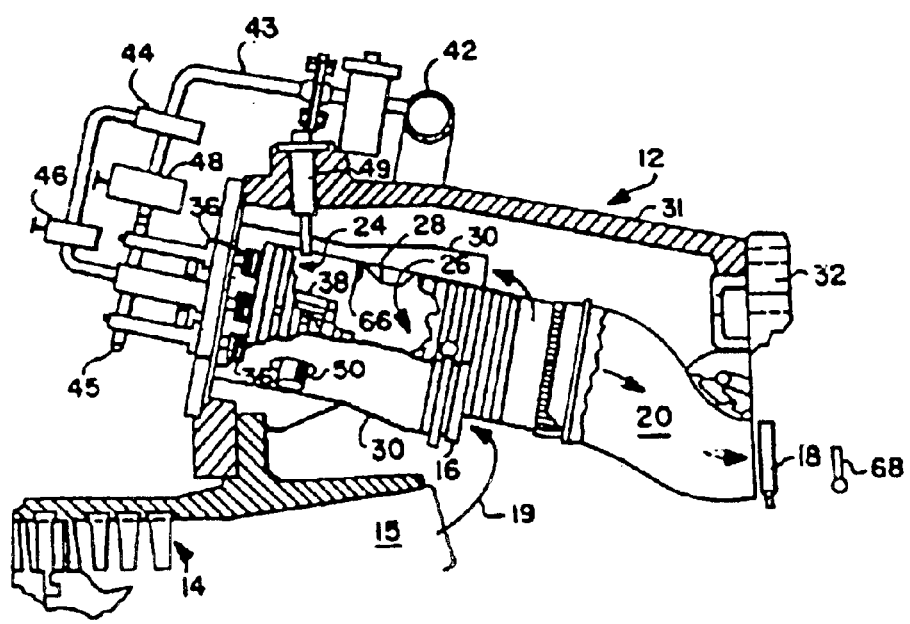
FIG. 1 is an elevation view of a gas turbine engine shown in partial cross section.

FIG. 1 shows a gas turbine 12 that includes a compressor 14, a compressor exhaust duct 15, multiple combustion chambers (one shown) 16 and a turbine 18 represented by a single blade. Although it is not specifically shown, it is well known that the turbine is drivingly connected to the compressor along a common axis. The compressor pressurized inlet air is turned, as shown by arrow 19, to the combustor where it cools the combustor and provides air for combustion.

The plurality of combustion chambers 16 are located about the periphery of the gas turbine. In one particular gas turbine, there are fourteen chambers disposed about the periphery of the gas turbine. A transition duct 20 connects the outlet of a particular combustion chamber to the inlet of the turbine to deliver the hot products of the combustion process to the turbine.

The invention is particularly useful in a dual stage, dual mode low $NO_x$ combustor of the type described in U.S. Pat. No. 4,292,801. As described in that patent and shown in FIGS. 1 and 2, each combustion chamber 16 comprises a primary or upstream combustion reaction zone 24 and a secondary or downstream combustion reaction zone 26 separated by a venturi throat region 28. Each combustion chamber is surrounded by a combustor flow sleeve 30 that channels compressor discharge air flow to the chamber. The chamber is further surrounded by an outer casing 31 bolted to the turbine casing 32.

Primary fuel nozzles 36 deliver fuel to the upstream reaction zone 24 and are arranged in an annular array around a central secondary fuel nozzle 38. In one model gas turbine, each combustion chamber may include six primary nozzles and one secondary nozzle. Fuel is delivered to the nozzles from a centralized annular fuel manifold 42. From this manifold, fuel is piped 43 through a filter and to fuel distributors for the primary 24 and secondary 26 combustion reaction zones. The secondary distributor 44 routes fuel to the secondary fuel nozzle 38 and the primary distributor 45 is an annular piping unit that routes fuel to the primary nozzles 36.

Each distributor has an associated fuel trim unit. The secondary fuel trim unit 46 for the secondary distributor has an adjustable valve 60 operated by a technician. The technician reads sensor signals from pressure, temperature, and fuel flow rate sensors. A similar primary fuel trim unit 48 trims the fuel flow to the primary nozzles. Ignition in the primary combustion chamber is caused by a spark plug 48 and by adjacent combustion chambers through crossfire tubes 50.

Figure 2:
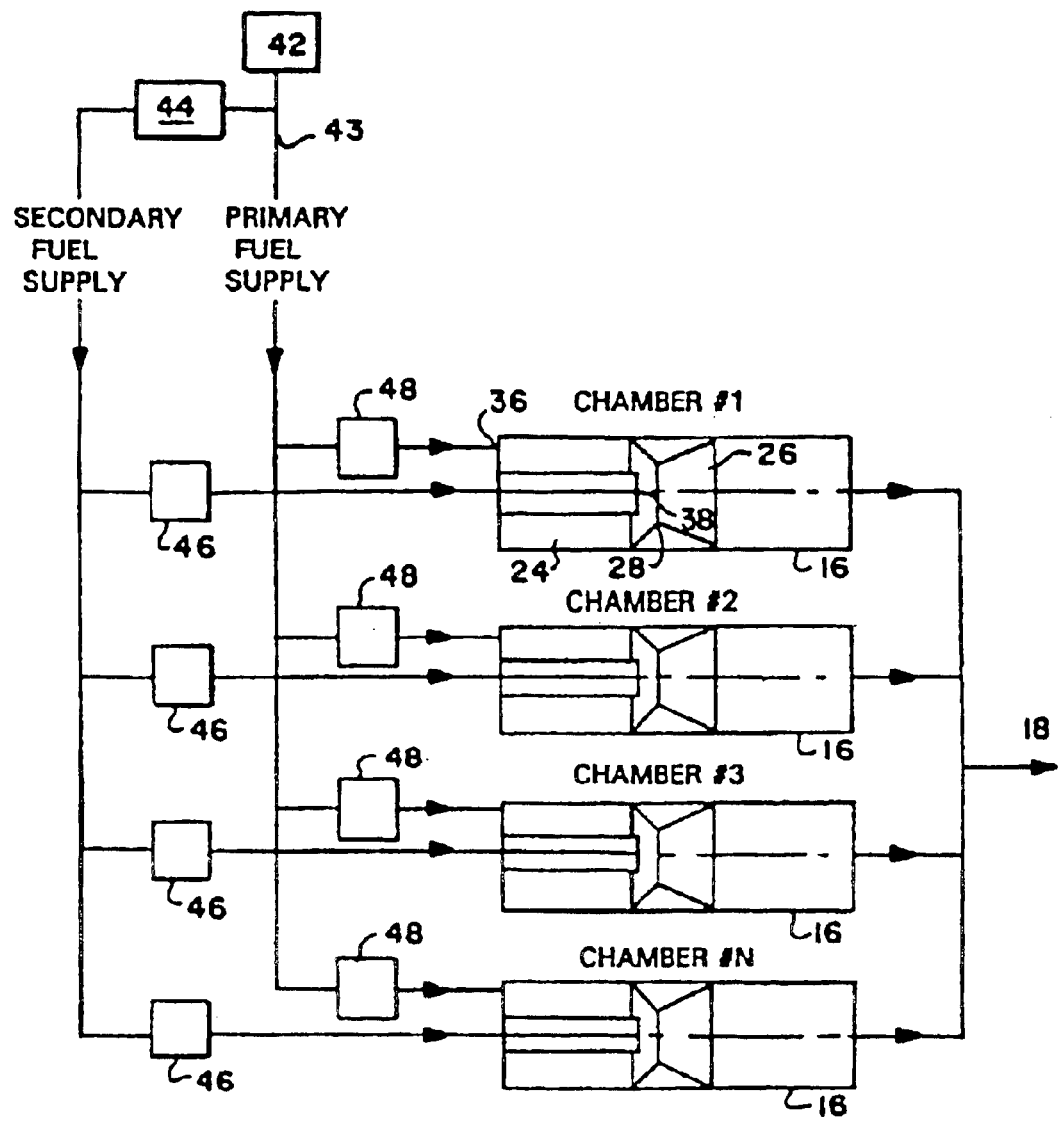
FIG. 2 is a block diagram of a fuel trimming system in accordance with the present invention.

FIG. 2 shows a fuel trim system as applied to a dual stage, dual mode low $NO_x$ combustion system as described in U.S. Pat. No. 4,292,801. The multiple combustion chambers 16 of a gas turbine combustion system are labeled chambers 1, 2, 3 to N, where N is the total number of combustion chambers in the combustion system. Combustion reactions occur in both the primary and secondary reaction zones in each chamber, either independently or in combination. Fuel and air are introduced into the reaction zones of the combustion chamber, combustion occurs, and fuel is oxidized releasing heat which results in a temperature and pressure rise in the combustion gases. In a typical application, the fuel is a hydrocarbon, such as methane, $CH_4$, and oxidation products of combustion to equilibrium are primarily carbon dioxide, $CO_2$, and water, $H_2O$. The combustion products are usually diluted with excess air provided as dilution air through the combustor from the compressor.

The distribution of hot gas temperature within the reaction zones 24, 26 of all combustion chambers 16 depends upon the fuel-air ratios in the reaction zones of each chamber. The distribution of hot gas temperature and pressure in the flow of combustion gases exiting the combustion chambers and entering the first stage of the turbine 18 depends upon the overall fuel-air ratio in each of the combustion chambers.

In general, the air flow rate will vary to each of the combustion chambers. The fuel flow to each reaction zone in each chamber is trimmed to account for the air flow variation. The fuel flow to each individual combustion chamber primary and secondary reaction zone is trimmed, i.e., raised or lowered, relative to the average fuel flow to all chambers. This trimming is accomplished by the fuel trim system 46, 48 that match the fuel flow to the air flow for each combustion chamber.

The technician adjusts the fuel flow rate to both the secondary and primary fuel nozzles in response to conditions monitored. This adjustment can be made at any time during operation of the gas turbine, but will usually be done at installation or during overhaul of the gas turbine. By trimming the fuel rate individually to each combustion chamber, the fuel flow rate can be matched to the individual air flow rate in each combustion chamber to maintain a constant fuel-air ratio in each chamber.

Figure 3:
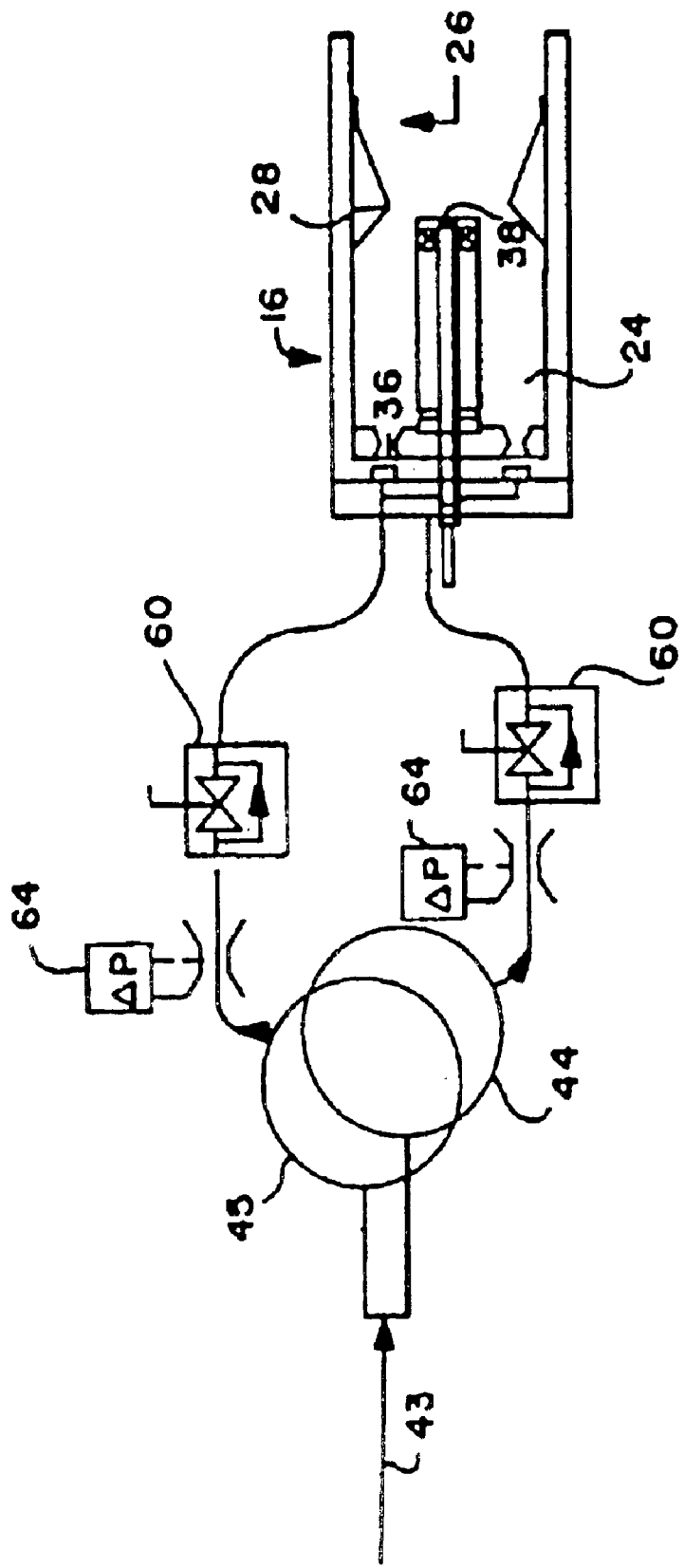
FIG. 3 is a schematic diagram of the instrumentation and control system for the fuel trim system shown in FIG. 2.

FIG. 3 shows a configuration for the fuel trim unit 46 or 48 for a single combustion chamber. A fuel trim control valve 60 adjusts the fuel flow rate to each reaction zone 24, 26 by varying the flow resistance of the fuel supply line to each zone of each combustion chamber.

The measured parameters used to set the fuel trim control valve are (1) measured fuel flow rate to each fuel trim system; (2) measured combustion chamber dynamic pressure, and (3) measured gas temperature distribution in the gas turbine exhaust. A technician monitors individual combustion chamber dynamic pressures, the distribution of gas turbine exhaust temperature and individual combustion chamber fuel flow rates.

A conventional fuel flow meter 64 is included in the fuel trim system to measure the fuel flow rate to each reaction zone in each combustion chamber. This measured fuel flow rate is used to maintain a desired fuel flow split between the primary and secondary reaction zones in each combustion chamber. The total fuel flow to each chamber and the fuel flow to each reaction zone is adjusted via valves 60 to match air flow distribution to the chamber.

A conventional dynamic pressure sensor 66 (FIG. 1) in each combustion chamber provides chamber pressure measurements that are displayed to the technician adjusting the fuel trim valves 60. Similarly, a conventional exhaust thermocouple array 68 (FIG. 1 shows just one thermocouple probe) provides the technician with data regarding the temperature distribution of exhaust gases exiting the turbine. Given the data from the pressure and temperature sensors and the fuel flow meters, a technician can adjust the fuel trim valves to each of the reaction zones to each combustion chamber. In this manner, the fuel flow to each reaction zone can be trimmed to maintain a uniform fuel-air mixture in all combustion chambers.

Figure 4:
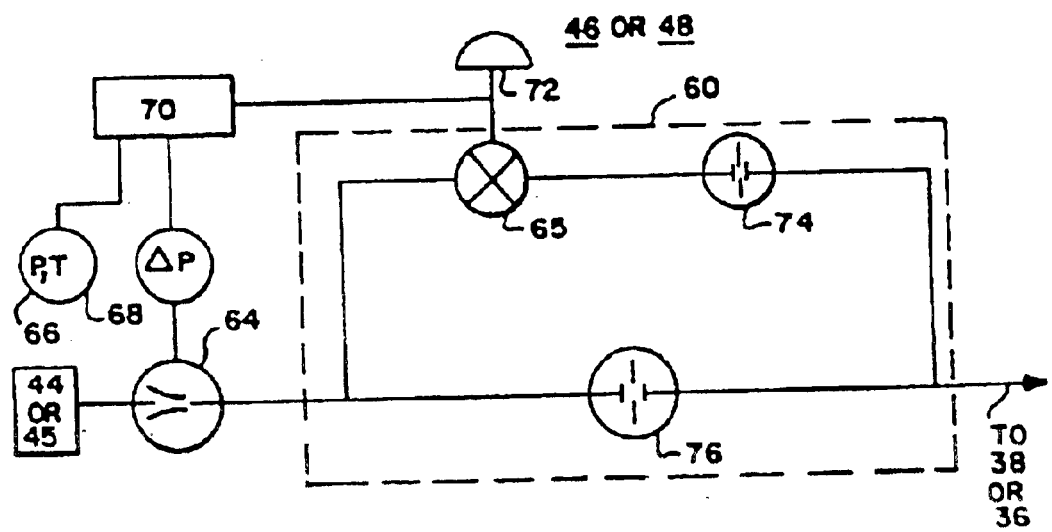
FIG. 4 is a schematic diagram of a computerized instrument.

FIG. 4 shows a detailed diagram of a fuel trim unit in an alternative embodiment where the fuel trim valves are under computer, rather than manual, control. A computer 70 monitors the sensor data to continuously trim fuel flow to maintain a uniform fuel-air ratio in each combustion chamber. In the manual method, the trim valves 60 are set to a fixed position at installation and may be adjusted during maintenance. This manual operating method suffices because the air flow distribution is not expected to change significantly over the life of the turbine. Thus, once the fuel flow is trimmed to match each chamber at installation of the gas turbine, it is reasonable to expect that the fuel-air match will be valid for the life of the gas turbine. However, continuous computer controlled fuel trimming could be desirable where truly exact fuel-air trimming is desired.

The computer controller 70 is a conventional controller such as the MARK V controller computer for industrial gas turbines sold by the assignee General Electric Company. The computer receives sensor data from the exhaust thermocouple array 68 and chamber dynamic pressure sensors 66. Similarly, the computer controller receives fuel flow rate data from the flow meters 64 for each reaction zone. Using the sensor inputs, the computer controller activates a solenoid 72 that adjusts the fuel trim valve 65.

The fuel trim valve 60 in both manual and computer controlled embodiments includes the trim valve 65 and a trim fuel orifice 74 in series and a parallel main fuel orifice 76. The parallel main and trim fuel orifices protect the gas turbine from unintentional extreme variations in fuel flow distribution among combustion chambers. If all fuel flowed through the fuel trim orifice, then extreme fuel variations might occur while the fuel flow is being trimmed to match air flow. The parallel main and trim orifices limit the maximum fluctuation of fuel flow due to the fuel trim unit.

The invention has been described as applied to a two stage low $NO_x$ combustion system. However, it could be applied to a single stage low $NO_x$ combustion system, a single stage conventional combustion system or any other gas turbine combustion system provided the system uses multiple combustion chambers.

Figure 5:
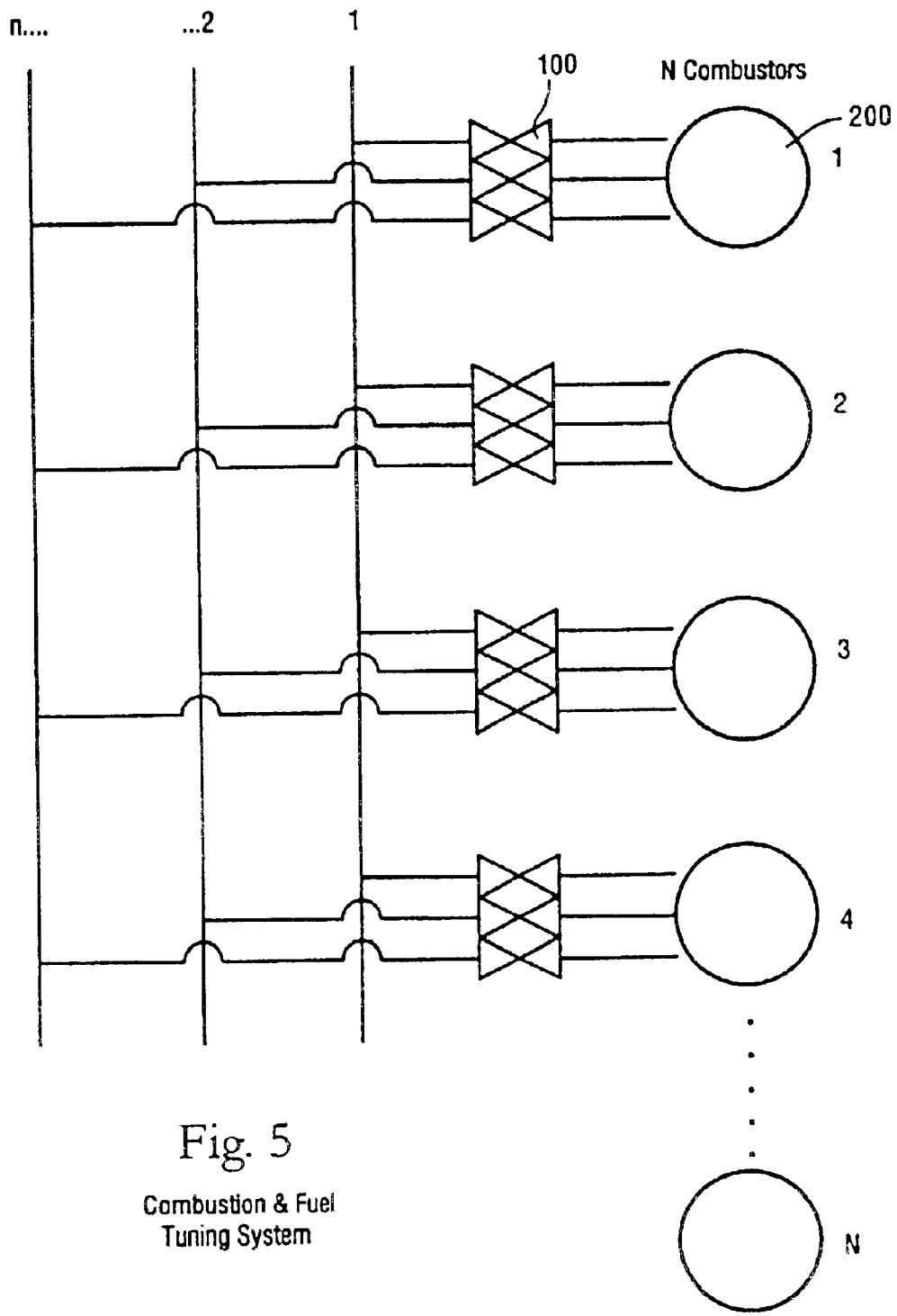
FIG. 5 is a schematic representation of an exemplary embodiment of a general combustion and fuel system arrangement using active fuel tuning.

FIG. 5 shows in schematic form an example of the configuration of the general combustion and fuel system arrangement associated with active fuel tuning. In FIG. 5, each of 1-N combustors 200 is fed fuel from 1-n fuel lines through respective fuel valves 100. The coordinated, active control of tuning valves on each of 1 to n fuel circuits to each of 1 to N combustion chambers minimizes the total nitrous oxide emissions produced by the sum of all chambers while maintaining the dynamic pressure oscillations in all combustion chambers within acceptable limits. The control system actively tunes each control valve 100 by monitoring the total nitrous oxide emissions and the dynamic pressure oscillations in each combustion chamber 200. The tuning algorithm utilizes known relationships between the dynamic pressure oscillations and nitrous oxide emissions produced as a function of fuel to air ratio and fuel split between the independent fuel circuits. The tuning algorithm also leverages learning algorithms that improve on the general $NO_x$ and dynamics relationships that are used as a starting point.

Figure 6:
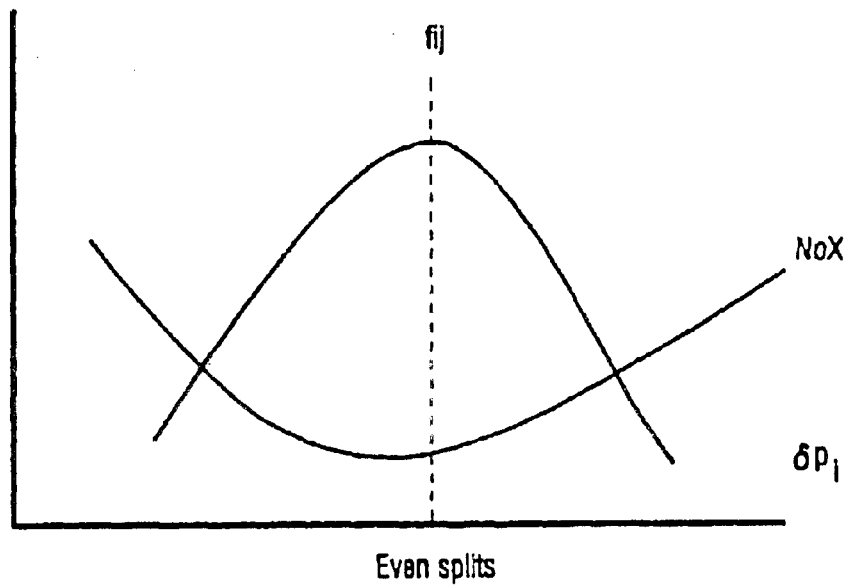
FIG. 6 shows exemplary relationships for combustion system emissions.
Figure 7:
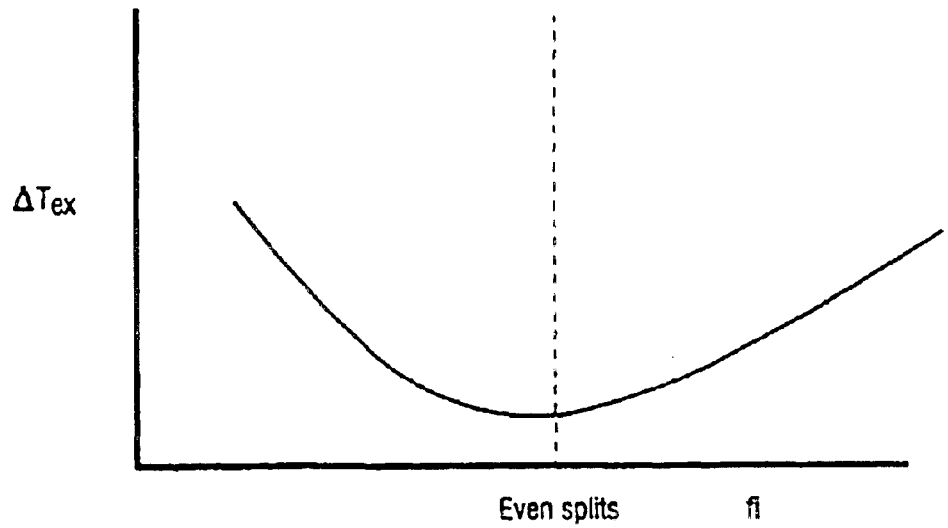
FIG. 7 shows exemplary relationships for combustion pressure dynamics.

FIGS. 6 and 7 show examples of these relationships for one possible combustion configuration. For example, FIG. 6 shows how $NO_x$ emissions and dynamic pressure oscillations ($\delta_{Pi}$) vary as a function of fuel delivered. As can be seen for a given valve of delivered fuel, $NO_x$ emissions are minimized while dynamic pressure oscillations are at a maximum. FIG. 7 shows that as the delivered fuel varies so does the temperature of exhaust gasses ($\Delta T_{ex}$).

The tuning algorithm of the present invention leverages the nonlinear nature of the emissions versus fuel to air ratio characteristics to shift fuel away from the fuel nozzles with the highest incremental emissions decrease per unit of fuel flow decrease, and towards the nozzle with the smallest incremental emissions increase per unit of fuel flow increase. The net effect will be to maximize the power output capability of the gas turbine while minimizing, in a multivariate sense, the total emissions and individual dynamic pressure oscillations in each individual combustion chamber. The tuning algorithm is also able to utilize the variation in fuel/air ratio between the combustors to optimize power output performance in the gas turbine. One way to detect the variation in fuel/air ratio between combustors is to detect or sense the exhaust temperatures of the combustors. Another way to detect the variation in fuel/air ratio between combustors is to use thermocouples to detect the flame temperature in each combustor. Each tuning algorithm is specific to a particular gas turbine and is determined by the operating characteristics of that gas turbine.

This process extends similarly to the measurement and limiting of any other undesirable emissions including carbon monoxide. The function which will be minimized is that which is most limiting when compared to the allowable output thresholds of each type of emissions.

This process is applicable for any multi-chamber combustion system which in the general case will be assumed to be comprised of individual combustion chambers where N=number of combustion chambers.

Fuel is delivered to each combustion chamber by multiple fuel circuits that are scheduled independently where n=number of fuel circuits.

The fuel delivered to each chamber through each fuel circuit is $f_{ij}$=The fuel delivered to the $i^{th}$ chamber through the $j^{th}$ fuel circuit.

The total fuel delivered to any chamber is the sum of the fuel delivered to that chamber through all fuel circuits, or $$f_i = \sum_{j=1}^{n} f_{ij} = \text{fuel flow delivered to } i^{th} \text{ chamber.}$$

The total fuel flow delivered to the gas turbine is $$f_T = \sum_{i=1}^{n} \sum_{j=1}^{n} f_{ij} = \text{total fuel flow delivered to gas turbine.}$$

The mean combustion chamber fuel flow is $$\bar{f} = \frac{f_T}{N} = \text{mean chamber fuel flow.}$$

The nitrous oxide level delivered by any individual combustion chamber is $NO_{xj}=NO_x$ from $i^{th}$ chamber.

The nitrous oxide level delivered by the gas turbine is the mean combustion chamber level of $$\overline{NO}_X = \text{machine } NO_X = \frac{1}{N}\sum_{i=1}^{N} NO_{x_i}$$

Note that $NO_x$ is a non-linear function of $f_{ij}$.

$\Delta NO_x = fn[(NO_{xj}-NO_{xT}), \ldots (NO_{xN}-NO_{xT})]$ $\delta p_i$=combustor dynamics in $i^{th}$ chamber.

Note that the combustor dynamics are a highly non-linear function.

$\bar{\delta} p$=mean combustor dynamics in machine $\Delta(\delta p_i)$=variation in chamber-to-chamber combustor dynamics $=fn[(\delta p_i - \bar{\delta}p), \ldots (\delta p_N - \bar{\delta}p)]$ $\Delta T_{ex}$=exhaust temperature profile $=fn[(f_{ii-1}), \ldots (f_N - \bar{f})]$ Key control parameters are KCP's: $f_{ij}$, f Measurable Y's: $\overline{NO}_x$, $\Delta\delta(p_i)$, $\Delta T_{ex}$ at machine.

NOTE: $NO_{Xi}$ and $\delta_{Pi}$ respond oppositely to $f_{ij}$ manipulations.

The control strategy includes the following tasks:

I. Simultaneously optimize (minimize) $\Delta(\delta p_i)$, $\Delta(NO_{Xi})$, $T_{ex}$ by controlling $f_{ij}$.

II. a) At base load, control $f_T$ to increase $\overline{NO}_x$ to a pre-established value (i.e., to 8.9 ppm for 9 ppm guarantee)

Note Items I and II will be executed continuously, i.e., as ambient changes b) At part load, execute Part I but maintain pre-selected load or variation in fuel/air ratio (machine exhaust temperature).

In accordance with the above tasks I and II, the operation of the control strategy will now be described. The gas turbine is provided with a way of sensing the variation of fuel/air ratio between the combustors, i.e., for example a plurality of temperature sensors in the exhaust or thermocouples in the combustor chambers. The spread between the lowest and the highest temperature, and indeed, the temperature pattern in and around the circumference, is indicative of differing operating conditions amongst the combustor cans. It is desirable to reduce this variation. This is achieved by a model based method for inferring which cans are causing temperature spreads to be higher than normal, and a control action to bring the cans to a uniform operating condition. The model would be a combination of physical equations, as well as data based equations such as those used by a Neural Network. This control action would ensure that the temperatures in the combustor cans are substantially the same and that the average temperature is a good approximation of individual can temperatures.

It is known that $NO_x$ is directly correlated to combustion temperature. Hence, controlling temperature controls $NO_x$. The idea is to estimate the amount of $NO_x$ produced by each can via a nonlinear model for $NO_x$ production. Models for estimating bulk $NO_x$ amounts from measured parameters exist. The novelty in this invention is to estimate $NO_x$ amounts produced by individual cans. Even if on-line measurement of $NO_x$ is available, this method can be used to apportion the total $NO_x$ amount amongst the cans. Once the relative amount of $NO_x$ emitted by each can is inferred, the system manipulates the fuel flows to the individual cans to reduce, or control, the amount.

This would not be difficult if controlling $NO_x$ was unconstrained. Unfortunately, this is not the case. Dynamic pressure in combustor cans is a function of temperature as well, and changing the temperature can lead to higher acoustics. Hence the $NO_x$ control is subject to the operational constraint of keeping acoustics below acceptable levels. This is done by sensing the dynamic pressure in each can; processing the signals and sending them to the controller. The $NO_x$ control algorithm then uses these signals to constrain the optimization.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gas turbine having a plurality of chambers, each one of said chambers comprising:
    at least one combustion reaction zone receiving air from a compressor and fuel from a fuel distributor;
    said fuel distributor having a fuel trim orifice and a fuel trim valve, said fuel trim valve for said each one of said chambers being individually adjustable to trim the flow of fuel to the chamber;
    a pressure sensor detecting a dynamic gas pressure in the chamber;
    a variation sensor for detecting the variation in fuel/air ratio from said plurality of chambers; and
    a computer controller coupled to said fuel trim valve and said sensors, and programmed for operatively adjusting the fuel trim valve to optimize the dynamic gas pressure detected by the pressure sensor and the variation in fuel/air ratio detected by the variation sensor, and for further adjusting the fuel trim valve for each one of said chambers to maintain said variation in fuel/air ratio at a predetermined level.

2. A gas turbine as claimed in claim 1, said variation sensor comprising a plurality of thermocouples for sensing the chamber temperature of each one of said plurality of chambers.

3. A gas turbine having a plurality of chambers, each one of said chambers comprising:
    at least one combustion reaction zone receiving air from a compressor and fuel from a fuel distributor;
    said fuel distributor having a fuel trim orifice and a fuel trim valve, said fuel trim valve for said each one of said chambers being individually adjustable to trim the flow of fuel to the chamber;
    a pressure sensor detecting a dynamic gas pressure in the chamber;
    a variation ratio sensor for detecting the variation in fuel/air ratio from said plurality of chambers; and
    a computer controller coupled to said fuel trim valve and said sensors, and programmed for operatively adjusting the fuel trim valve to optimize the dynamic gas pressure detected by the pressure sensor and the variation in fuel/air ratio detected by the variation sensor, and for further adjusting the fuel trim valve for each one of said chambers to maintain $NO_x$ emissions at a predetermined level.

4. A gas turbine as claimed in claim 3, said variation sensor comprising a plurality of thermocouples for sensing the chamber temperature of each one of said plurality of chambers.

5. A control system for a gas turbine having multiple combustors, and multiple fuel lines and valves to at least one of said multiple combustors, said control system comprising:
    at least one pressure sensor for detecting dynamic gas pressure in said multiple combustors;
    at least one variation sensor for detecting variation in fuel/air ratio between said multiple combustors;
    a computer controller coupled to said multiple fuel valves and said sensors, and programmed for operatively adjusting said multiple fuel valves to enhance the dynamic gas pressure detected by said at least one pressure sensor and the variation in fuel/air ratio detected by said at least one variation sensor, and for further adjusting said multiple fuel valves to maintain the variation in fuel/air ratio at a predetermined level.

6. A control system as claimed in claim 5, said at least one variation sensor comprising at least one thermocouple for sensing chamber temperature of at least one of said multiple combustors.

7. A control system for a gas turbine having multiple combustors, and multiple fuel lines and valves to at least one of said multiple combustors, said control system comprising:
    at least one pressure sensor for detecting dynamic gas pressure in said multiple combustors;
    at least one variation sensor for detecting variation in fuel/air ratio between said multiple combustors;
    a computer controller coupled to said multiple fuel valves and said sensors, and programmed for operatively adjusting said multiple fuel valves to enhance the dynamic gas pressure detected by said at least one pressure sensor and the variation in fuel/air ratio detected by said at least one variation sensor, and for further adjusting said multiple fuel valves to maintain $NO_x$ emissions at a predetermined level.

8. A control system as claimed in claim 7, said at least one variation sensor comprising at least one thermocouple for sensing chamber temperature of at least one of said multiple combustors.

9. A control system for a gas turbine having multiple combustors, and multiple fuel lines and valves to at least one of said multiple combustors, said control system comprising:
    pressure sensor means for detecting dynamic gas pressure in said multiple combustors;
    means for detecting variation in fuel/air ratio between said multiple combustors;

computer controller means coupled to said multiple fuel valves, said pressure sensor means and said detecting means, and programmed for operatively adjusting said multiple fuel valves to enhance the dynamic gas pressure detected by said pressure sensor means and the variation in fuel/air ratio detected by said detecting means, and for further adjusting said multiple fuel valves to maintain the variation in fuel/air ratio at a predetermined level.

10. A control system as claimed in claim 9, said detecting means comprising at least one thermocouple for sensing chamber temperature of at least one of said multiple combustors.

11. A control system for a gas turbine having multiple combustors, and multiple fuel lines and valves to at least one of said multiple combustors, said control system comprising:

pressure sensor means for detecting dynamic gas pressure in said multiple combustors;

means for detecting variation in fuel/air ratio between said multiple combustors;

computer controller means coupled to said multiple fuel valves, said pressure sensor means and said detecting means, and programmed for operatively adjusting said multiple fuel valves to enhance the dynamic gas pressure detected by said pressure sensor means and the variation in fuel/air ratio detected by said detecting means, and for further adjusting said multiple fuel valves to maintain $NO_x$ emissions at a predetermined level.

12. A control system as claimed in claim 11, said detecting means comprising at least one thermocouple for sensing chamber temperature of at least one of said multiple combustors.

* * * * *